United States Patent [19]

Spence et al.

[11] Patent Number: 4,758,353

[45] Date of Patent: Jul. 19, 1988

[54] REMOVAL OF HEAVY METALS FROM WASTE STREAMS

[75] Inventors: Michael D. Spence, Farmington Hills; John M. Kozaruk, Harper Woods; Mark Melvin, Belleville; Stephen M. Gardocki, Utica, all of Mich.

[73] Assignee: Nalco Chemical Company, Naperville, Ill.

[21] Appl. No.: 63,893

[22] Filed: Jun. 19, 1987

[51] Int. Cl.$^4$ ................................................ C02F 1/56
[52] U.S. Cl. .................................... 210/725; 210/727; 210/734; 210/912
[58] Field of Search ............... 204/DIG. 13; 210/702, 210/704, 705, 725, 727, 728, 734, 912, 913, 914

[56] References Cited

U.S. PATENT DOCUMENTS

| | | | |
|---|---|---|---|
| 3,238,127 | 3/1966 | Sebba | 210/704 |
| 3,575,853 | 4/1971 | Gaughan et al. | 210/720 |
| 4,005,009 | 1/1977 | Kinoshita et al. | 210/912 |

FOREIGN PATENT DOCUMENTS 2243559  3/1973  Fed. Rep. of Germany ...... 210/705

Primary Examiner—Peter Hruskoci
Attorney, Agent, or Firm—John G. Premo; Anthony L. Cupoli; Donald G. Epple

[57] ABSTRACT

Heavy metals are removed from effluent waters using the sequential steps comprising:
A. Adding a surfactant;
B. pH adjustment;
C. Adding a cationic coagulant;
D. Adding a flocculant; and,
E. Recovering the floc formed by the flocculant.

4 Claims, No Drawings

REMOVAL OF HEAVY METALS FROM WASTE STREAMS

DEFINITIONS

The term "ppm" is used to denote parts per million on an actives basis.

FIELD OF THE INVENTION

The field of the invention relates to the removal of heavy metals such as lead, zinc, aluminum, copper and titanium from waste water. More particularly, the field relates to a method of removing such heavy metals by coagulation and precipitation.

BACKGROUND OF THE INVENTION

Heavy metals are stringently controlled in many instances by government regulations. It has been found that in some waste water systems, that these heavy metals are difficult to remove.

One such type of heavy metal containing waste water is found in the automobile industry. The waste water is produced when automobile bodies and panels are treated for corrosion resistance. A common method of treatment is to use ionic coating materials in an electrophoretic process commonly abbreviated ELPO. The ELPO waste waters which result from this coating process to contain large quantities of heavy metals which typically are difficult to remove because soluble complexes containing them are formed.

Generally, high concentrations of coagulant are added to these systems to remove as much heavy metal complex as possible. However, even with this treatment many times it is necessary to dilute the waste water to the point where it meets federal standards.

It would be desirable to provide a process that would afford enhanced removal of these heavy metals.

THE INVENTION

The invention, is a method for removal heavy metals from ELPO waste streams. Typical heavy metals include zinc, aluminum, lead, copper, and titanium.

Included in the invention is a surfactant, a coagulant and flocculent. The surfactant provides a vehicle for placing the heavy metal in condition for coagulation. Typically the surfactants may be anionic or nonionic or a combination of anionic and nonionic surfactants.

In addition to these surfactants, a coagulant is utilized to coagulate the heavy metal which has been placed in condition for coagulation by the surfactant. The coagulant will induce the heavy metal to form a floc which will float or precipitate for collection and removal from the system.

Additionally an anionic flocculent is added to build up the floc to further facilitate removal.

In practice, it is desirable to adjust the pH within the range of 8-10 and most preferably within the range of 8½ to 9½ for most heavy metals.

Although, the ingredients can be added simultaneously, it is preferred that the surfactant be added first, the coagulant be added thereafter, and the flocculent be added after the coagulant.

DISCUSSION

The invention includes a method of providing a coagulatable heavy metal ion in ELPO waste streams. This is done by adding a surfactant. Once the coagulatable ions are produced then a coagulant can be utilized to coagulate the ions so that they form a floc which can be removed from the ELPO system. The floc can be built up further utilizing flocculent.

SURFACTANT

The surfactant can be anionic or nonionic. Preferred anionic surfactants include coconut oils-fatty acid soaps, and sodium lauryl ether sulfate.

Preferred nonionic surfactants includes nonyl phenol, ethoxylate and ethylene glycol monostearate. Although a combination of these surfactants may be utilized, the anionic surfactants alone will suffice.

When the anionic surfactant is added it is preferred that between 7-333 ppm of the surfactant be added to the ELPO waste water, after pH adjustment to within the range of 8.0 to 10.0. It is most preferred that from 37-148 ppm of surfactant be utilized.

The reason for choosing this pH range is that this is the range in which heavy metal ions tends to be least soluble. At pH's less than 8 or greater than 10 the heavy metals tend to more readily stay in solution.

It is believed, that the heavy metal ions form complexes which tend to maintain the solubility of those ions in the ELPO waste streams. The utility of the surfactant appears to be its ability to separate the heavy metal from the complexing agent. Thereby, the heavy metal is placed in condition for coagulation and removal from the ELPO system.

A most preferred surfactant is given below:

| Surfactant A | Weight Percent |
| --- | --- |
| Coconut oil fatty acids, diethanolamine soap | 4% |
| Nonyl Phenol Ethoxylate | 1% |
| Sodium Lauryl Ether Sulphate | 30% |
| Citric Acid | 1% |
| Ethylidene Glycol Monostearate | 1% |
| Water | 63% |

COAGULANTS

A coagulant is added to remove coagulatable heavy metal ion from the system. It is preferred, that between 10 to 200 ppm be added after the pH of the system has been adjust to within the range of 8 and 10 and preferrably within the range of 8½ and 9½. It is most preferred that between 50 to 115 ppm be added. Generally any coagulant utilized in water treatment is usable, included among these are diallyldimethyl ammonium chloride polymer, epichlorohydrin-dimethylamine polymers aka Epi-DMA polymers, ethylene amine homopolymer, polyaluminum chloride and alum.

The coagulant used in the Examples is Coagulant A which is a mixture of polyaluminum chloride (based on 7.4% $Al_2O_3$) and 1.5% Epi-DMA with the remainder being water and approximately 1 to 2 weight percent stabilizer for the coagulant composition.

In practice, the surfactant should preferrably be added to the system then the system is adjusted to a pH within the range of 8-10. Preferably between 37 to 148 ppm of surfactant utilized suffice. Subsequently, enough coagulant should be added to initiate floc formation, preferably between 50-115 ppm of coagulant will be utilized.

In addition to the coagulant other clarifiers or flocculents may be utilized as desired.

FLOCCULENTS

To further facilitate removal of the coagulated heavy metal a flocculent is added. Generally any flocculent can be added although anionic flocculents are most preferred. Acceptable anionic polymers include polymers containing acrylate and sulfonate. A preferred acrylate is an acrylamide/acrylate copolymer having an RSV greater than 23. Generally 0.3 to 5.0 ppm on an actives basis is sufficient. Most preferably between 0.56 to 2.8 ppm will be utilized.

COMPARATIVE TESTS

Comparative tests are provided in Table I. For these tests the jars of sample were dosed as indicated in Table II. The relevant ions contained in the sample jars are provided in Table III-VI.

Where both surfactant and coagulant were used, the surfactant was introduced first, pH was adjusted using caustic subsequently coagulant and finally flocculent was added.

TABLE I

|  | 3.3% Elpo | Jar No. 2 Caustic Alone | Jar No. 3 New Treatment | Jar No. 4 Coagulant A |
|---|---|---|---|---|
| Zinc |  |  |  |  |
| Tot. | .34 | .35 | .07 | .14 |
| Sol. | .34 | .19 | .03 | .01 |
| Aluminum |  |  |  |  |
| Tot. | 12 | 4.3 | .5 | 7.2 |
| Sol. | 8.7 | 3.0 | — | 1.0 |
| Lead |  |  |  |  |
| Tot. | 19 | 3.9 | .12 | 2.0 |
| Sol. | 17 | 3.8 | .09 | .5 |
| Copper |  |  |  |  |
| Tot | .42 | .59 | .01 | .29 |
| Sol. | .10 | .10 | .01 | .14 |
| Titanium |  |  |  |  |
| Tot. | 3.4 | 1.4 | .01 | 1.2 |
| Sol. | 1.2 | .44 | .01 | .29 |

Below are the dosages and pH's for this treatment.

TABLE II

|  | pH Adjusted to | Surfactant A ppm | Coagulant A ppm |
|---|---|---|---|
| Jar No. 2 | 9.0 | 0 | 0 |
| Jar No. 3 | 9.0 | 92 ppm | 26 ppm |
| Jar No. 4 | 9.0 | 0 | 26 ppm |

For Jars 2, 3 and 4 from 0.56 to 2.8 ppm actives acrylamide/sodium acrylate copolymer (RSV 23) was used as a flocculent. The flocculent was the last chemical added.

TABLE III

SAMPLE MARKED: 3.3% ELPO WATER ANALYSIS

|  | *FILTERABLE* PPM | TOTAL PPM |
|---|---|---|
| CATIONS |  |  |
| Calcium (CaCo3) | 78. | 78. |
| Magnesium (CaCO3) | 32. | 32. |
| Sodium (CaCo3) | .12 | .12 |
| Tin (Sn) | 35. | 35. |
| Copper (Cu) | 0.1 | 0.42 |
| Iron (Fe) | 0.70 | 0.71 |
| Strontium (Sr) | 0.11 | 0.11 |
| Titanium (Ti) | 1.2 | 3.4 |
| Zinc (Zn) | 0.34 | 0.34 |
| Zirconium (Zr) | 0.1 | 0.23 |
| Aluminum (Al) | 8.7 | 12. |

TABLE III-continued

SAMPLE MARKED: 3.3% ELPO WATER ANALYSIS

|  | *FILTERABLE* PPM | TOTAL PPM |
|---|---|---|
| Lead (Pb) | 17. | 19. |
| ANIONS |  |  |
| Silica (SiO2) | 8.3 | 14. |
| Sulfur (S) | 6.5 | 6.7 |

*Passes through a 0.45 micron filter

TABLE IV

SAMPLE MARKED: JAR #2 - CAUSTIC ALONE

|  | *FILTERABLE* PPM | TOTAL PPM |
|---|---|---|
| CATIONS |  |  |
| Calcium (CaCo3) | 41. | 42. |
| Magnesium (CaCO3) | 32. | 32. |
| Sodium (CaCo3) | 85. | 85. |
| Tin (Sn) | 8.8 | 9.6 |
| Copper (Cu) | 0.1 | .59 |
| Iron (Fe) | 0.19 | 0.58 |
| Strontium (Sr) | 0.1 | 0.11 |
| Titanium (Ti) | .44 | 1.4 |
| Zinc (Zn) | 0.19 | 0.35 |
| Zirconium (Zr) | 0.1 | 0.15 |
| Aluminum (Al) | 3.0 | 4.3 |
| Lead (Pb) | 3.8 | 3.9 |
| ANIONS |  |  |
| Silica (SiO2) | 4.3 | 8.2 |
| Sulfur (S) | 6.5 | 7.6 |

*Passes through a 0.45 micron filter

TABLE V

SAMPLE MARKED: JAR #3 - NEW TREATMENT

|  | *FILTERABLE* PPM | TOTAL PPM |
|---|---|---|
| CATIONS |  |  |
| Calcium (CaCo3) | 64. | 68. |
| Magnesium (CaCO3) | 31. | 33. |
| Sodium (CaCo3) | 140. | 140. |
| Potassium (K) | 1.0 | 1.0 |
| Tin (Sn) | 0.6 | 0.7 |
| Iron (Fe) |  | 0.06 |
| Strontium (Sr) | 0.12 | 0.13 |
| Zinc (Zn) | 0.03 | 0.07 |
| Aluminum (Al) |  | 0.5 |
| Lead (Pb) | 0.09 | 0.12 |
| ANIONS |  |  |
| Silica (SiO2) | 4.3 | 8.2 |
| Sulfur (S) | 6.5 | 7.6 |

*Passes through a 0.45 micron filter

TABLE VI

SAMPLE MARKED: JAR #4 - PRODUCT A

|  | *FILTERABLE* PPM | TOTAL PPM |
|---|---|---|
| CATIONS |  |  |
| Calcium (CaCo3) | 74. | 75. |
| Magnesium (CaCO3) | 32. | 32. |
| Sodium (CaCo3) | 140. | 140. |
| Tin (Sn) | 1. | 4.2 |
| Copper (Cu) | 0.14 | 0.29 |
| Iron (Fe) | 0.1 | 0.33 |
| Titanium (Ti) | 0.29 | 1.2 |
| Zinc (Zn) | 0.1 | 0.14 |
| Aluminum (Al) | 1. | 7.2 |
| Lead (Pb) | 0.5 | 2.0 |
| ANIONS |  |  |
| Silica (SiO2) | 1. | 7.2 |
| Sulfur (S) | 7.5 | 8.5 |

*Passes through a 0.45 micron filter

Therefore, we claim as follows:

1. A method for removing heavy metals from effluent water comprising performing sequentially the following steps:
   (a) adding from 7–333 ppm of an anionic surfactant to said effluent water to provide coagulatable heavy metal ion;
   (b) adjusting the effluent water pH to within the range of 8 to 10,
   (c) providing from 10–200 ppm of a cationic coagulant to coagulate said heavy metal ion,
   (d) providing from 0.3 to 5.0 ppm of a polymeric flocculant whereby a heavy metal containing floc is formed for removal from said effluent water, and,
   (e) then removing said floc from said effluent water, wherein said anionic surfactant is sodium lauryl ether sulfate; the cationic coagulant is selected from the group consisting of diallyl dimethylammonium chloride polymer, epichlorohydrin dimethylamine polymer, ethylene amine polymer, polyaluminum chloride, and alum; and the flocculant is an acrylamide/sodium acrylate copolymer having an RSV greater than 23.

2. The method of claim 1 wherein a nonionic surfactant is also added during step (a).

3. The method of claim 1 wherein the anionic surfactant includes a mixture of anionic and nonionic surfactants.

4. The method of claim 4 wherein the mixture includes coconut oil fatty acid soap and nonyl phenol ethoxylate.

* * * * *